United States Patent [19]
Okuno et al.

[11] Patent Number: 5,109,454
[45] Date of Patent: Apr. 28, 1992

[54] LIGHT COMMUNICATION APPARATUS

[75] Inventors: Jun Okuno; Toshio Mizue, both of Kanagawa, Japan

[73] Assignee: Sumitomo Electric Industries Ltd., Osaka, Japan

[21] Appl. No.: 574,219

[22] Filed: Aug. 29, 1990

[30] Foreign Application Priority Data

Sep. 29, 1989 [JP] Japan ................................. 1-254731

[51] Int. Cl.⁵ ................................................ G02B 6/32
[52] U.S. Cl. ......................................... 385/92; 385/89; 357/30
[58] Field of Search ............... 350/96.20, 96.21, 96.15, 350/96.17; 250/227.14, 227.15, 227.17, 227.24, 552; 357/17, 19, 30, 74, 80

[56] References Cited
U.S. PATENT DOCUMENTS

| 4,268,756 | 5/1981 | Crouse et al. | 250/239 |
| 4,427,879 | 1/1984 | Becher et al. | 250/215 |
| 4,722,586 | 2/1988 | Dodson et al. | 350/96.20 |
| 4,818,056 | 4/1989 | Enochs et al. | 350/96.15 X |
| 5,005,939 | 4/1991 | Arvanitakis et al. | 350/96.20 |

Primary Examiner—Frank Gonzalez
Assistant Examiner—Phan T. Heartney
Attorney, Agent, or Firm—Cushman, Darby & Cushman

[57] ABSTRACT

A light communication apparatus having a plurality of light communication apparatus units buried therein. Photo-connector receptacles of the light communication apparatus units are integrally formed with a coupling member to form a multi-core photo-receptacle. The multi-core photo receptacle is formed so that no jig is necessary to position each photo-connector receptacle.

6 Claims, 7 Drawing Sheets

LIGHT COMMUNICATION APPARATUS

BACKGROUND OF THE INVENTION

1. Field of the Invention

The present invention relates to a light communication apparatus, and particularly to a light communication apparatus that includes a plurality of light communication apparatus units and is arranged so that all the light communication apparatus units are connected at the same time to optical fibers numbering the same as the communication apparatus units.

2. Description of the Related Art

A light communication apparatus unit in which a photo-connector receptacle, an optical element and a peripheral circuit of the optical element are integrated with one another is used broadly in the field of light communication. FIGS. 4(a) and 4(b) show a conventional light communication apparatus unit in a perspective view and a partly sectional view respectively. The light communication apparatus unit 10 shown in FIGS. 4(a) and 4(b) includes photo-connector receptacle 41 attached on a side surface of housing 11, optical element 43 mounted on photo-connector receptacle 41, and peripheral circuit 44 of optical element 43 housed within the housing 11 and electrically connected with optical element 43. The photo-connector receptacle 41 is attached so as to penetrate housing 11. Optical element 43 is supported by a holder 45 integrally formed with optical member 47, a lens or the like, and mounted on an end portion of photo-connector receptacle 41 inside housing 11. Sleeve 46 is provided interior the section of photo-connector receptacle 41 exposed outside housing 11 so that a photo-connector plug attached to an optical fiber can be connected with high precision. Further, terminal 42, for electrically connecting light communication apparatus unit 10 with another electric circuit, are provided so as to be exposed outside the housing 11.

FIG. 5 shows a partly sectional plan view of a light communication apparatus including two communication apparatus units of the type described above. The light communication apparatus in FIG. 5 is mainly constituted by receptacle body 22 and two light communication apparatus units 10. Photo-connector receptacles 41 of respective light communication apparatus units 10 in combination with receptacle body 22 constitute two-core photo- connector receptacle 20. A two-core photo-connector plug can be connected to two-core photo-connector receptacle 20 so that optical fibers can be on and off, respectively, in the two light communication apparatus units 10 at the same time. Bolt holes 9 are provided at four places in the receptacle body 22 so that the receptacle body 22 can be fixed to a substrate or the like.

FIGS. 6(a) to 6(c) show the steps of assembling the light communication apparatus of FIG. 5 on a substrate. First, as shown in FIG. 6(a), jig 23 is inserted from the top end of receptacle body 22 and the two light communication apparatus units 10 from the rear end. The respective positions of the light communication apparatus units 10 are determined relative to receptacle body 22. Jig 23 has a shape substantially the same as that of the two-core photo-connector plug connected to the two-core photo-connector receptacle 20 shown in FIG. 5. By placement of jig 23, the positions of the two light communication apparatus units 10 are determined lo so as to comprise a two-core connector receptacle together with receptacle body 22.

Next, as shown in FIG. 6(b), while jig 23 and light communication apparatus units 10 are kept stationary, terminal 12 is soldered in a predetermined position on substrate 25. Finally, as shown in FIG. 6(c), the receptacle body 22 is fixed by bolts 26 and nuts 27, thereby completing a light communication apparatus.

When the above-mentioned conventional light communication apparatus is assembled by the above steps, the positions of light communication apparatus units 10 are determined by use of jig 23, so that errors $\Delta x$, $\Delta y$, $\Delta z$ and $\Delta \theta$ in the directions indicated in FIG. 7 are restrained within allowable limits.

In such a conventional light communication apparatus, it has been inevitable to determine the positions of light communication apparatus units using a jig at the time of assembly. That is, the positions of light transmitters and receivers have been determined individually by an adjustment jig during assembly process, so as to restrain the positions within a desired accuracy which is necessary for a two-core connector receptacle. Therefore, mass production of the light communication apparatus has been impossible due to the necessity of excess time.

Moreover, in conventional light communication apparatus, housings of respective light communication apparatus units have been made of metal independently, thereby greatly inflating the cost of these portions.

SUMMARY OF THE INVENTION

It is therefore an object of the present invention to solve the foregoing problems inherent in the prior art.

Another object of the present invention is to provide a light communication apparatus that can be mass-produced at a low price.

In order to attain the foregoing objects, according to the present invention, the light communication apparatus comprises a plurality of light communication apparatus units, each including an optical element, a peripheral circuit of the optical element and a photo-connector receptacle capable of being connected with a photo-connector plug attached to an optical fiber so as to optically combine the optical element with the optical fiber when connected. At least the photo-connector receptacles of the plurality of light communication apparatus units are integrated with one another via a coupling member so as to constitute a multi-core photo-connector receptacle capable of being connected with a multi-core photo-connector plug formed by integrated photo-connector plugs which number the same as the light communication apparatus units, the multi-core photo-connector receptacle being of an integral molding type wherein the plurality of photo-connector receptacles are buried so as to be pre-positioned in the coupling member.

The light communication apparatus according to the present invention has a main feature being that the multi-core photo-connector receptacle thereof is of an integral molding type. That is, the light communication apparatus according to the present invention is superior for mass production as compared with the prior art since it is unnecessary to determine the positions of photo-connector receptacles during assembly of the present invention.

Moreover, in the light communication apparatus according to the present invention, it is preferable that light communication apparatus units are housed in a housing formed integrally with the above-mentioned integral molding multi-core photo-connector receptacle.

BRIEF DESCRIPTION OF THE DRAWING

Other objects, features and advantages of the present invention as well as the methods of operation and functions of the related elements of the structure, and to the economies of manufacture will become apparent upon consideration of the following description taken in connection with the appended claims and the accompanying drawings, wherein:

DETAILED DESCRIPTION OF THE PRESENTLY PREFERRED EXEMPLARY EMBODIMENT

Figure 1A:
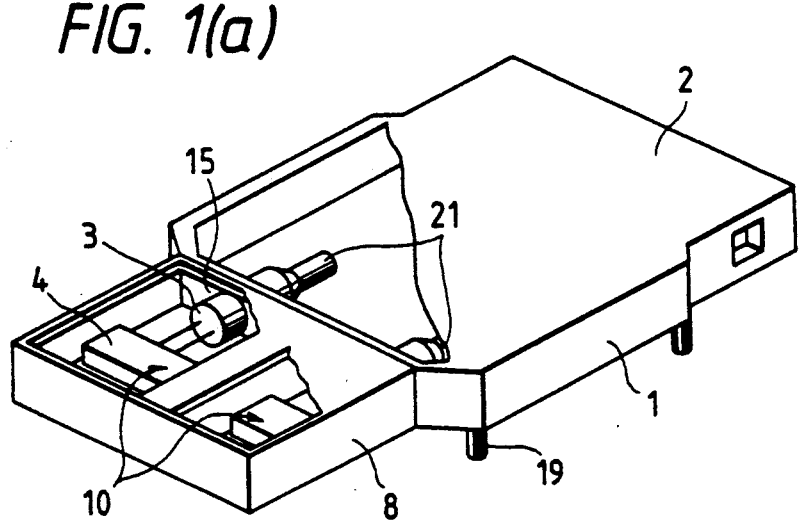
FIG. 1(a) is a partly cut-away perspective view of the light communication apparatus according to the present invention.
Figure 1B:
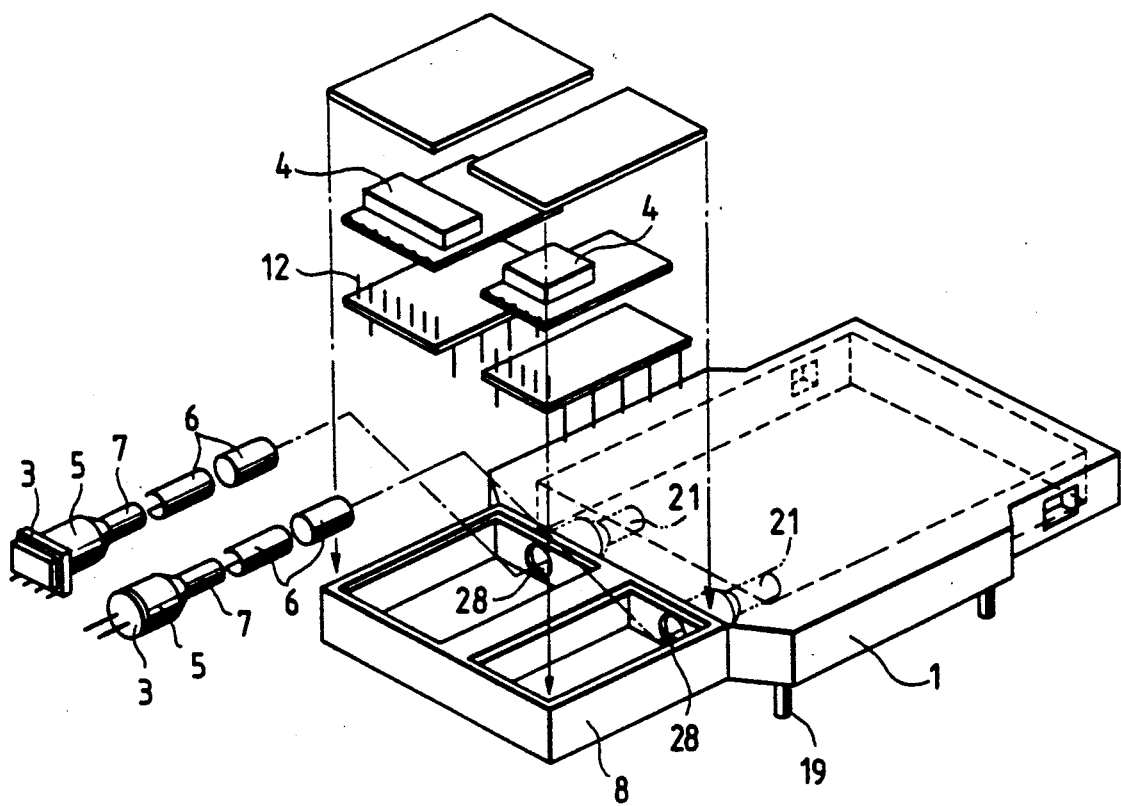
FIG. 1(b) is an exploded perspective view of the light communication apparatus of FIG. 1(a)
Figure 2:
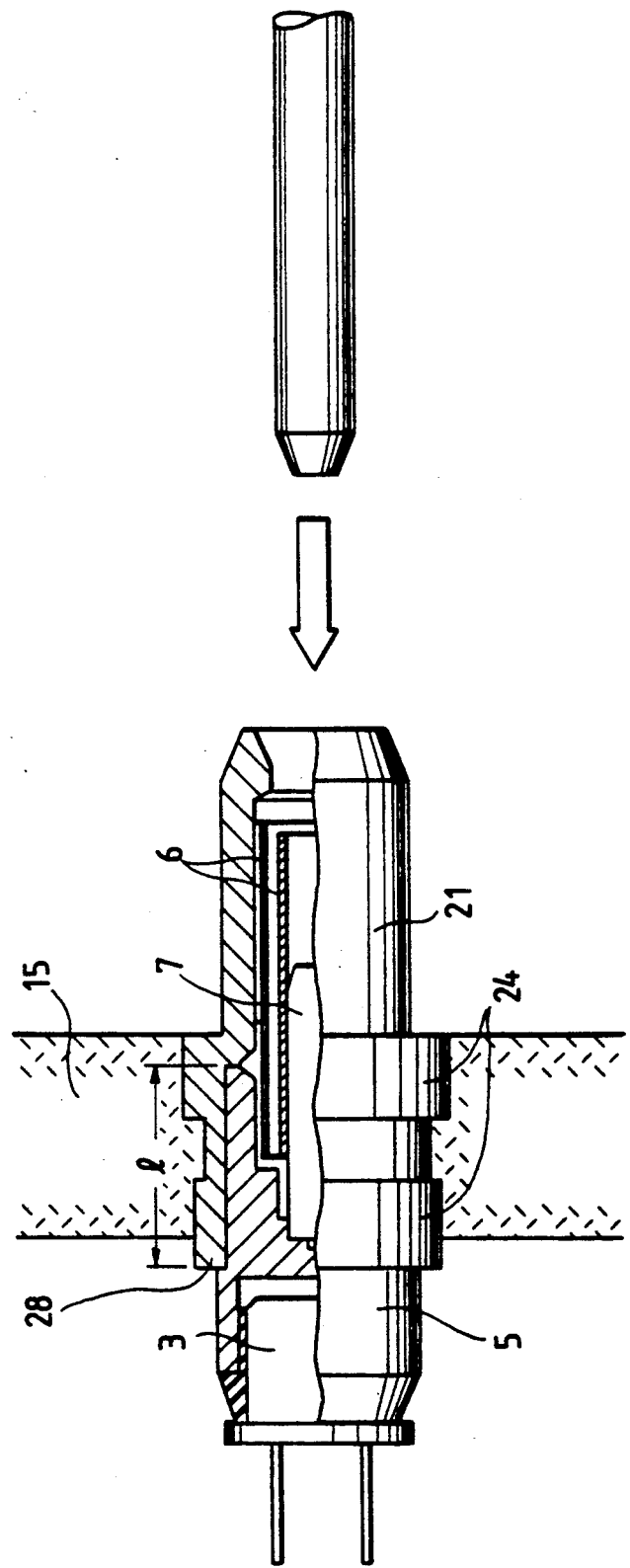
FIG. 2 is an enlarged sectional view showing part of the light communication apparatus of FIG. 1(a)

FIGS. 1(a) and 1(b) illustrate the configuration of an embodiment of the light communication apparatus according to the present invention with FIGS. 1(a) and 1(b) being a partly cut-away perspective view and an exploded perspective view respectively. FIG. 2 is an enlarged sectional view showing part of the light communication apparatus. In this light communication apparatus, photo-connector receptacles 21 of two light communication apparatus units 10 are buried in and integrated with coupling member 1 so as to constitute two-core photo-connector receptacle 2. In this embodiment, coupling member 1 is made of a plastic material, and photo-connector receptacles 21 are made of metal and buried in wall 15 at the time of forming coupling member 1. Fixing pins 19 are also buried in the coupling member 1.

Photo-connector receptacles 21 penetrate the wall 15 of the coupling member 1, and rear ends 28 of the photo-connector receptacles 21 are projected slightly inside housing 8 formed integrally with coupling member 1 in the rear end thereof. A sleeve 6 is inserted from the rear end 28 of each of photo-connector receptacles 21. The sleeve 6 has a double structure such that an inner split sleeve portion thereof acts to make a ferrule align with high accuracy and an outer split sleeve portion acts to press the inner split sleeve so as by an outer split sleeve so that the inner split sleeve is prevented from over expansion so that the ferrule is not broken.

Optical element 3 supported by holder 5 integrally formed with optical member 7 being further attached. The insertion length i of holder 5 is made long enough so that there occurs no displacement in an optical axis when the older 5 is inserted. Further, flanges 24 are provided on each photo-connector receptacle 21 so that the photo-connector receptacle 21 is steadily fixed when buried in wall 15.

Optical elements 3 are electrically connected with respective peripheral circuits 4 provided in the housing and the peripheral circuits 4 are electrically connected with terminals 12 which can be connected to a circuit outside housing 8.

Figure 3A:
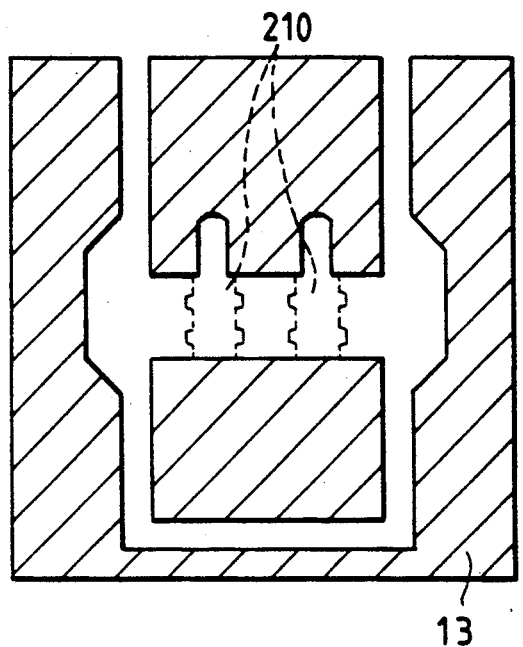
FIGS. 3(a) to (d) are sectional views illustrating the steps of a method of producing a coupling member 1 of the light communication apparatus in FIG. 1(a) by an insert molding method.
Figure 3B:
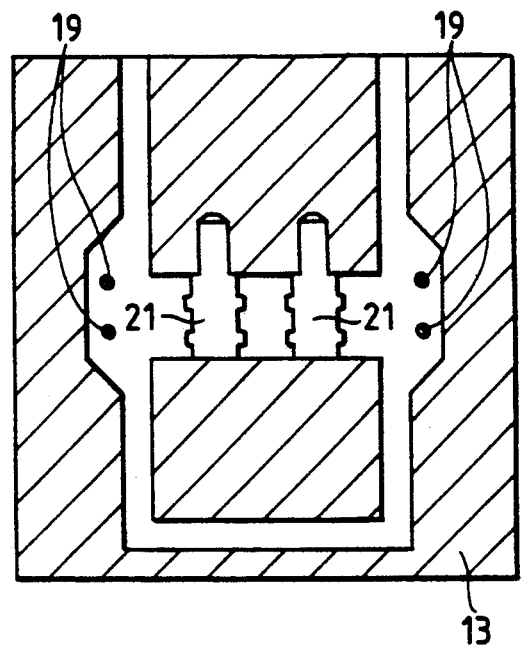
Figure 3C:
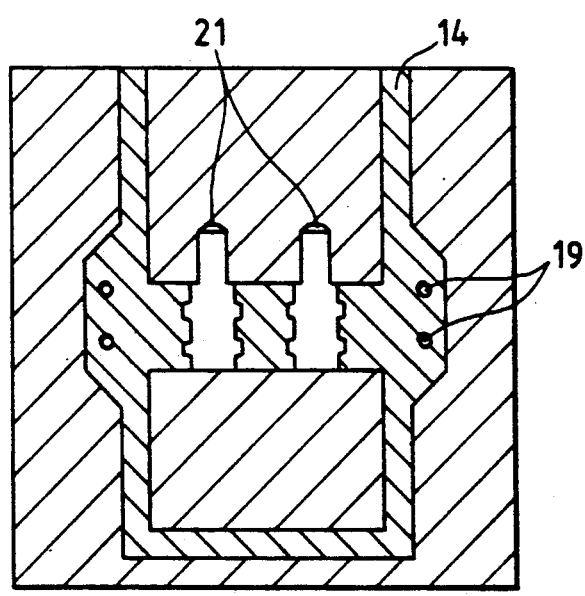
Figure 3D:
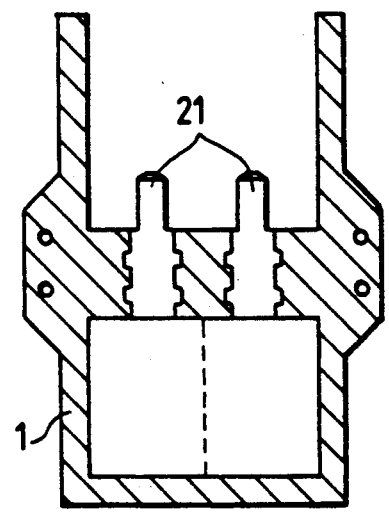
Figure 4A:
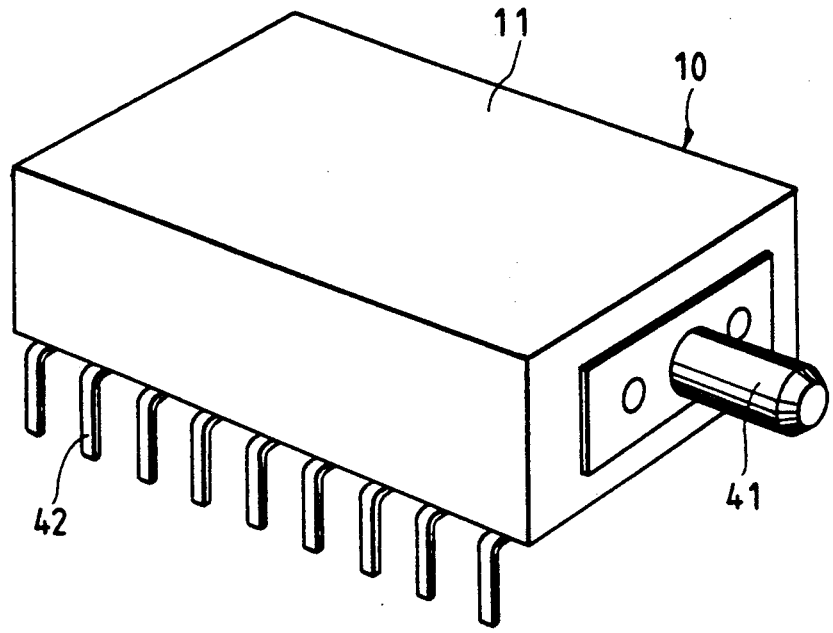
FIG. 4(a) is a perspective view of a conventional light communication apparatus unit.
Figure 4B:
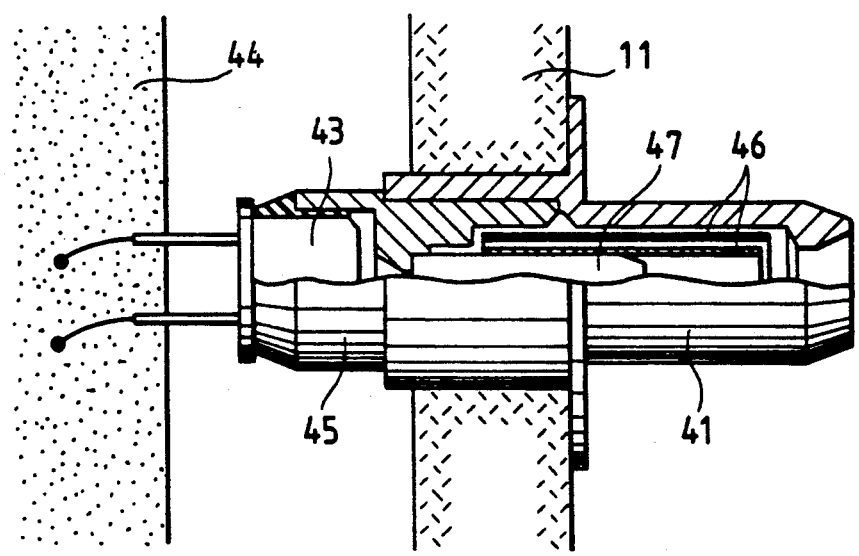
FIG. 4(b) is an enlarged sectional view illustrating part of the light communication apparatus unit shown in FIG. 4(a)
Figure 5:
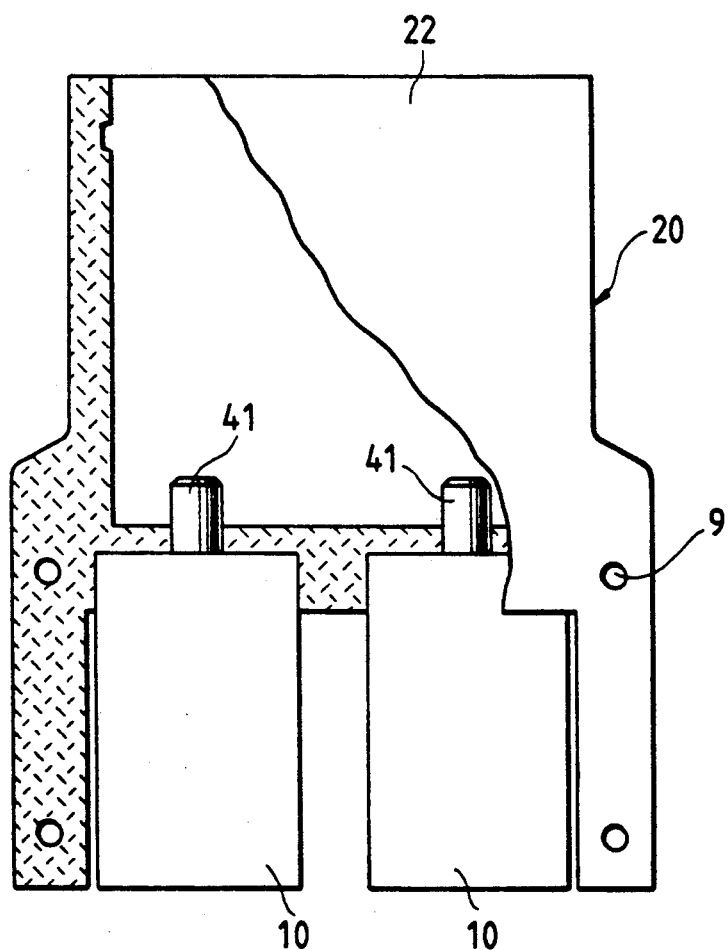
FIG. 5 is a partly cut-away plan view of the conventional light communication apparatus.
Figure 6A:
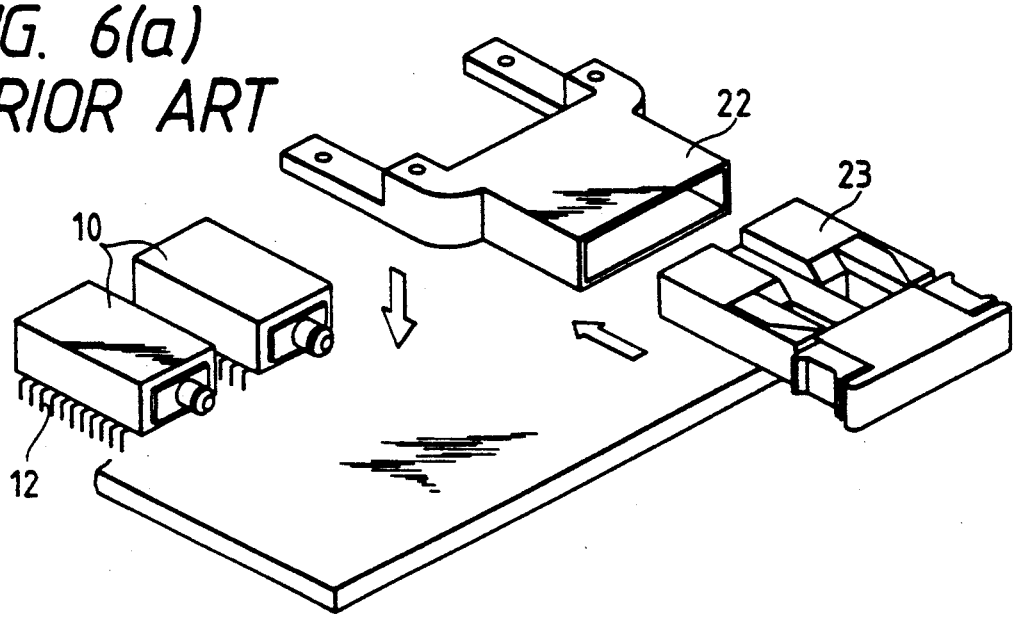
FIG. 6(a) to FIG. 6(c) are perspective views illustrating the steps for assembling process of the conventional light communication apparatus of FIG. 5.
Figure 6B:
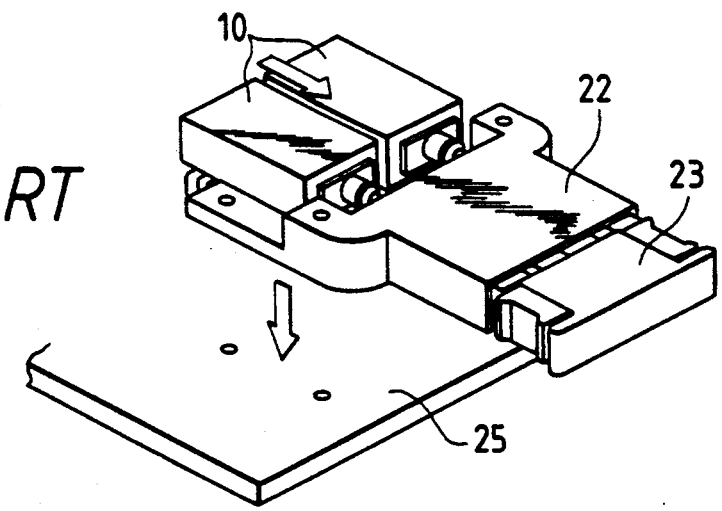
Figure 6C:
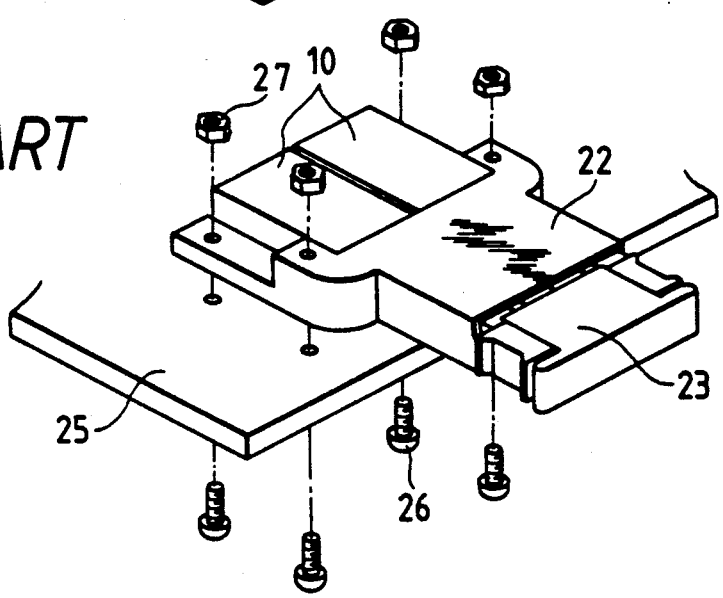
Figure 7A:
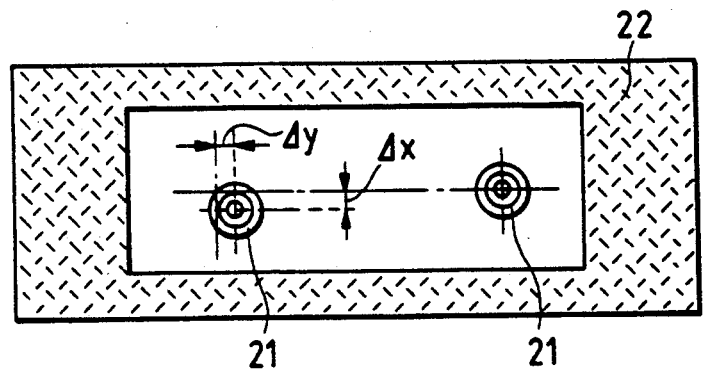
FIGS. 7(a) and 7(b) are plan and side views illustrating size errors produced in the assembling process of the conventional light communication apparatus of FIG. 5.
Figure 7B:
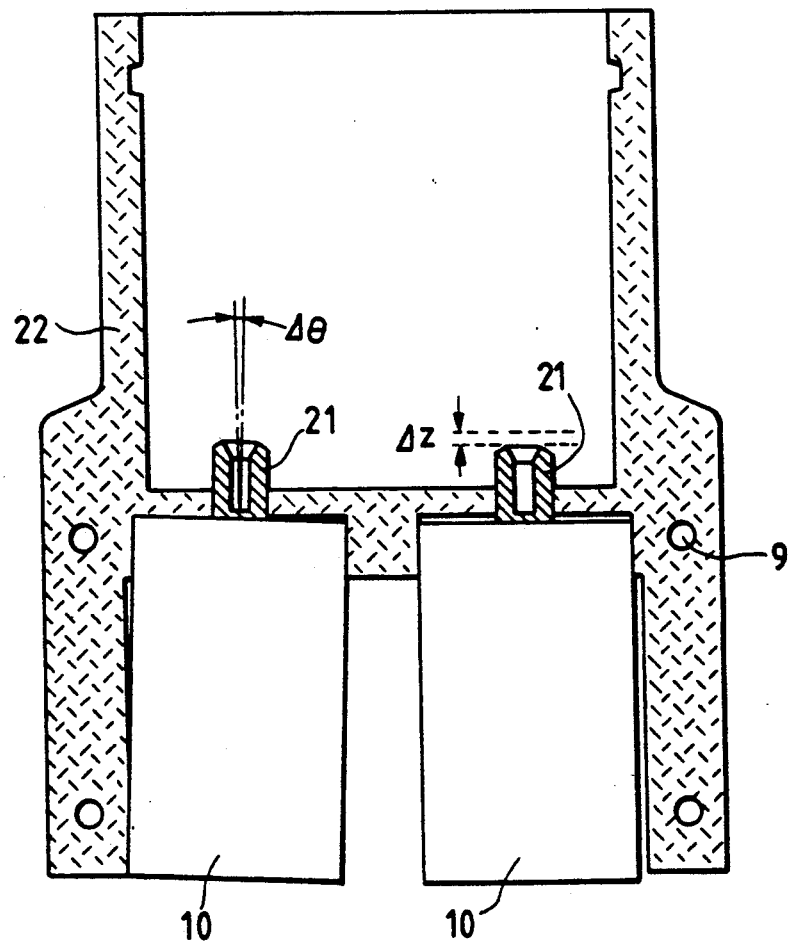

FIGS. 3(a) to 3(d) show the steps of a procedure of producing, by an insert molding method, the above-mentioned coupling member 1 in which photo-connector receptacles 21 of the light communication apparatus are buried. First, a mold 13 having such a shape as shown in FIG. 3(a) is prepared. Mold 13 has portions 210 finished with sufficient precision so that the photo-connector receptacles 21 can be buried therein. Next, as shown in FIG. 3(b), the photo-connector receptacles 21 and the pins 19 are attached to the mold 13. Then, as shown in FIG. 3(c), plastic material 14 is injected into mold 13, and when the plastic has solidified, the product is extracted from mold 13, thereby completing a coupling member 1 as shown in FIG. 3(d).

Since photo-connector receptacles 21 are buried with high precision in coupling member 1 prepared by the above-mentioned method, it is unnecessary to determine the positions of photo-connector receptacles 1 using a jig or the like during an assembly process. The light communication apparatus according to the present invention is therefore better suited for mass production. Moreover, if coupling member 1 is formed integrally with housing 8 as in this embodiment, it is possible to reduce cost by a large factor.

As has been described, in the light communication apparatus according to the present invention, a multi-core photo-connector receptacle is formed integrally so that it is possible to eliminate adjustment during the assembly process, and it is therefore possible to provide a light communication apparatus better suited for mass production. It is further possible to increase the percentage of the invention constructed from plastic portion. It is also possible to reduce the number of parts to thereby reduce production cost.

What is claimed is:

1. A light communication apparatus comprising:
    a plurality of light communication apparatus units, each of said light communication apparatus units including an optical element, a peripheral circuit and a photo-connector receptacle for connecting the light communication apparatus with a photo-connector plug attached to an optical fiber so as to optically combine said optical element with the optical fiber when said receptacle and plug are connected;
    wherein at least said photo-connector receptacles of said plurality of light communication apparatus units are integrated with one another by means of a coupling member, thereby forming a multi-core head-connector receptacle for connecting with a multi-core photo-connector plug formed by integrated photo-connector plugs which number the same as said light communication apparatus units; and wherein said multi-core photo-connector receptacle is of an integral molding type in which said plurality of said photo-connector receptacles are buried before formation of said coupling member, thus being positioned in said coupling member in advance.

2. A light communication apparatus according to claim 1, wherein said plurality of light communication apparatus units are housed in a housing which is formed integrally with said integral molding multi-core photo-connector receptacle.

3. A light communication apparatus as claimed in claim 1, wherein each of said light communication apparatus units further includes at least one flange provided on the photo-connector receptacle to secure said photo-connector receptacle.

4. A light communication apparatus as claimed in claim 1 wherein each of said light communication apparatus units further includes a holder supporting said optical element.

5. A light communication apparatus as claimed in claim 4 wherein an insertion length of said holder is long enough so that no displacement of an optical axis occurs when the holder is inserted.

6. A method of forming a light communication coupling member with light communication units buried therein, said method comprising the steps of:
preparing a mold having portions wherein photo-connector receptacles may be buried;
attaching said photo-connector receptacles and mounting pins to the mold;
injecting a molten plastic material 14 into the mold;
allowing the plastic material to solidify;
withdrawing the light communication coupling member from said mold, said light communication coupling member having a plurality of photo-connector receptacles buried therein.

* * * * *